(12) United States Patent
Morimura et al.

(10) Patent No.: US 11,548,441 B2
(45) Date of Patent: Jan. 10, 2023

(54) OUT-OF-VEHICLE NOTIFICATION DEVICE

(71) Applicant: TOYOTA JIDOSHA KABUSHIKI KAISHA, Toyota (JP)

(72) Inventors: Junichi Morimura, Sunto-gun (JP); Seiji Arakawa, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 17/095,046

(22) Filed: Nov. 11, 2020

(65) Prior Publication Data

US 2021/0061171 A1 Mar. 4, 2021

Related U.S. Application Data

(63) Continuation of application No. 16/390,181, filed on Apr. 22, 2019, now Pat. No. 10,864,852.

(30) Foreign Application Priority Data

May 14, 2018 (JP) .............................. JP2018-092828

(51) Int. Cl.
*B60Q 5/00* (2006.01)
*G06V 20/56* (2022.01)
*G06V 40/10* (2022.01)

(52) U.S. Cl.
CPC .............. *B60Q 5/008* (2013.01); *G06V 20/56* (2022.01); *G06V 40/103* (2022.01)

(58) Field of Classification Search
CPC . B60Q 5/008; G06K 9/00791; G06K 9/00369

USPC ........................................................ 340/463
See application file for complete search history.

(56) References Cited

U.S. PATENT DOCUMENTS

| 8,670,891 | B1* | 3/2014 | Szybalski | B62D 1/286 |
| | | | | 701/23 |
| 9,494,940 | B1* | 11/2016 | Kentley | B60N 2/002 |
| 9,964,950 | B2 | 5/2018 | Takano | |
| 9,994,148 | B1* | 6/2018 | Kim | B60Q 5/006 |
| 10,017,116 | B2 | 7/2018 | Sato | |
| 10,310,508 | B2 | 6/2019 | Kunisa et al. | |
| 10,421,394 | B2 | 9/2019 | Morimura et al. | |
| 10,452,930 | B2 | 10/2019 | Sato | |

(Continued)

FOREIGN PATENT DOCUMENTS

| JP | 2001-282263 A | 10/2001 |
| JP | 2008273251 A | 11/2008 |

(Continued)

*Primary Examiner* — Omar Casillashernandez
(74) *Attorney, Agent, or Firm* — Sughrue Mion, PLLC

(57) ABSTRACT

An out-of-vehicle notification device includes a traveling state detecting unit configured to detect a traveling state of the host vehicle, a first output unit configured to output a sound to an outside of the host vehicle, and a notification control unit configured to cause the first output unit to output a traveling notification sound indicating that the host vehicle is traveling when the host vehicle is traveling and to output a vehicle stoppage notification sound indicating that the host vehicle is stopped when the host vehicle is stopped. The traveling notification sound is a continuous sound continuously output. The vehicle stoppage notification sound is an intermittent sound intermittently output or a repetitive sound of which an intensity is repeatedly changed.

10 Claims, 2 Drawing Sheets

(56) References Cited

U.S. PATENT DOCUMENTS

| | | | |
|---|---|---|---|
| 10,663,973 | B2 | 5/2020 | Hashimoto et al. |
| 10,759,425 | B2 | 9/2020 | Urano et al. |
| 10,895,875 | B2 | 1/2021 | Hashimoto et al. |
| 11,001,198 | B2 | 5/2021 | Morimura et al. |
| 11,275,382 | B2 | 3/2022 | Hashimoto et al. |
| 2007/0063827 | A1* | 3/2007 | Ferrone .................. B60Q 5/00 340/438 |
| 2007/0257783 | A1* | 11/2007 | Matsumoto ........... B60Q 1/506 340/426.25 |
| 2012/0242467 | A1* | 9/2012 | Fujii ...................... G10K 15/02 340/425.5 |
| 2012/0299716 | A1* | 11/2012 | Yoshino .................. B60Q 1/22 340/463 |
| 2013/0009769 | A1* | 1/2013 | Saito ...................... B60Q 5/008 340/466 |
| 2013/0033374 | A1* | 2/2013 | Nakajima ............. B60W 10/06 340/466 |
| 2013/0076504 | A1 | 3/2013 | Nakayama |
| 2014/0210602 | A1 | 7/2014 | Yokohama et al. |
| 2015/0060608 | A1* | 3/2015 | Carlson ................ B60T 8/1705 246/122 R |
| 2016/0378104 | A1* | 12/2016 | Hiei ......................... B60T 7/22 701/2 |
| 2018/0326995 | A1* | 11/2018 | Hiramatsu ...... B60W 30/18154 |
| 2019/0056737 | A1* | 2/2019 | Palanisamy ........... B60W 30/00 |
| 2020/0172010 | A1* | 6/2020 | Kudo ..................... B60Q 5/008 |

FOREIGN PATENT DOCUMENTS

| | | |
|---|---|---|
| JP | 2011-184037 A | 9/2011 |
| JP | 2013071516 A | 4/2013 |
| JP | 2014-148217 A | 8/2014 |
| JP | 2017105284 A | 6/2017 |
| WO | 2014097934 A1 | 6/2014 |

* cited by examiner

OUT-OF-VEHICLE NOTIFICATION DEVICE

CROSS-REFERENCE TO RELATED APPLICATION

This application is a continuation of U.S. application Ser. No. 16/390,181, filed Apr. 22, 2019, which claims the benefit of priority from Japanese Patent Application No. 2018-092828, filed on May 14, 2018, the entire contents of which are incorporated herein by reference.

TECHNICAL FIELD

The present disclosure relates to an out-of-vehicle notification device that performs notification about a traveling state with respect to a vicinity of the host vehicle by using a sound.

BACKGROUND

A device that performs notification about the approach of a host vehicle by using a sound is described in Japanese Unexamined Patent Publication No. 2014-148217. The device performs notification about an approaching state by changing a sound pressure corresponding to a distance between a notification target person and the host vehicle.

SUMMARY

It is desired to more appropriately perform notification about the traveling state of the host vehicle with respect to the notification target person when performing the notification by using a sound.

According to an aspect of the present disclosure, there is provided an out-of-vehicle notification device which performs notification about a traveling state of a host vehicle with respect to a vicinity of the host vehicle by using a sound, the device including: a traveling state detecting unit configured to detect the traveling state of the host vehicle; a first output unit configured to output a sound to an outside of the host vehicle; and a notification control unit configured to cause the first output unit to output a traveling notification sound indicating that the host vehicle is traveling when the host vehicle is traveling and to output a vehicle stoppage notification sound indicating that the host vehicle is stopped when the host vehicle is stopped based on the traveling state detected by the traveling state detecting unit. The traveling notification sound is a continuous sound continuously output from the first output unit and the vehicle stoppage notification sound is an intermittent sound intermittently output from the first output unit or a repetitive sound of which an intensity is repeatedly changed.

In the case of the out-of-vehicle notification device, a sound that is output when the host vehicle is traveling and a sound that is output when the host vehicle is stopped are different kinds of sounds from each other. Accordingly, the notification target person in the vicinity of the host vehicle can easily distinguish between the traveling states of the host vehicle with a difference between the kinds of sounds. In addition, since the vehicle stoppage notification sound is output when the host vehicle is stopped, the notification target person can recognize that the host vehicle is stopped. As described above, the out-of-vehicle notification device can more appropriately notify the notification target person of the traveling state of the host vehicle.

The out-of-vehicle notification device may further include a notification target person detecting unit configured to detect a notification target person in a vicinity of the host vehicle and a second output unit configured to output a sound to the outside of the host vehicle, the notification control unit may be configured to cause the second output unit to output a target person recognition sound indicating that the notification target person has been recognized to the notification target person when the notification target person is detected by the notification target person detecting unit, and the target person recognition sound may be a different kind of sound from the continuous sound. In this case, the out-of-vehicle notification device can notify the notification target person that the notification target person has been recognized by outputting the target person recognition sound to the notification target person. Accordingly, the notification target person can recognize that the host vehicle is aware of the presence of the notification target person and thus the notification target person can take an action with an easy mind.

In the out-of-vehicle notification device, the second output unit may be configured to be higher than the first output unit in directivity of an output sound and the notification control unit may be configured to cause the second output unit to output the target person recognition sound toward the notification target person detected by the notification target person detecting unit when causing the second output unit to output the target person recognition sound. In this case, the out-of-vehicle notification device can more appropriately output the target person recognition sound to the notification target person.

In the out-of-vehicle notification device, the host vehicle may be an automatically driven vehicle which automatically travels based on a traveling plan and the traveling state detecting unit may be configured to detect the traveling state based on the traveling plan. In this case, the out-of-vehicle notification device can perform notification about the traveling state of the automatically driven host vehicle by using a sound.

According to the aspect of the present disclosure, it is possible to more appropriately perform notification about the traveling state of the host vehicle with respect to the notification target person when performing the notification by using a sound.

DETAILED DESCRIPTION

Figure 1:
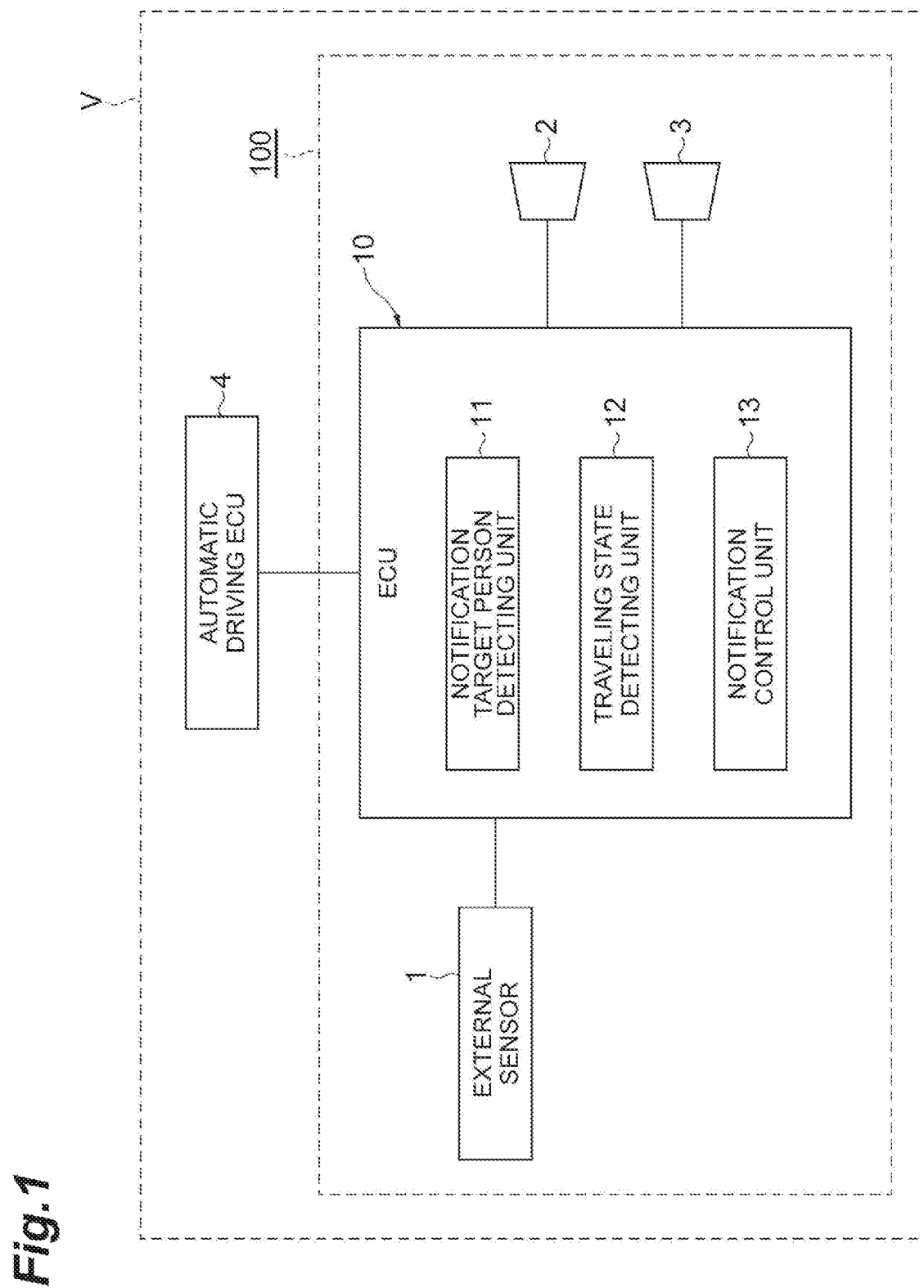
FIG. 1 is a diagram illustrating a schematic configuration of an out-of-vehicle notification device according to an embodiment.

Hereinafter, an embodiment of the present disclosure will be described with reference to drawings. Note that, the same elements will be given the same reference numerals in the description of the drawings and description thereof will not be repeated.

As shown in FIG. 1, an out-of-vehicle notification device 100 is a device that is installed in a host vehicle V such as a passenger car that can be automatically driven, the device performing notification about the traveling state of the host vehicle V with respect to the vicinity of the host vehicle V by using a sound. Automatic driving is vehicle control that causes the host vehicle V to automatically travel along a target route based on a traveling plan set in advance. In the case of the automatic driving, a driver does not need to perform a driving operation and the host vehicle V travels automatically. That is, the host vehicle V is an automatically driven vehicle which automatically travels based on a traveling plan.

The out-of-vehicle notification device 100 is provided with an electronic control unit (ECU) 10 that controls the entire device, an external sensor 1, a first speaker (first output unit) 2, and a second speaker (second output unit) 3. An automatic driving ECU 4 is further connected to the ECU 10. The ECU 10 is an electronic control unit including a central processing unit (CPU), a read only memory (ROM), a random access memory (RAM), a controller area network (CAN) communication circuit, and the like.

The ECU 10 is connected to, for example, a network that performs communication by using the CAN communication circuit and the ECU 10 is connected such that the ECU 10 can communicate with each component of the host vehicle V. That is, the ECU 10 can refer to the result of detection performed by the external sensor 1 and various kinds of information or the like related to traveling control of the host vehicle V from the automatic driving ECU 4. The ECU 10 can output a control signal for causing the first speaker 2 and the second speaker 3 to output a sound.

The ECU 10 loads a program stored in the ROM into the RAM and executes the program loaded in the RAM with the CPU so as to realize out-of-vehicle notification functions which will be described later. The ECU 10 may include a plurality of ECUs.

The external sensor 1 is a detecting device that is installed in the host vehicle V and that detects a situation in the vicinity of the host vehicle V. The external sensor 1 includes at least one of a camera and a radar sensor.

The camera is an imaging device that images the outside situation in the vicinity of the host vehicle V. The camera is provided such that the camera can image the vicinity of the host vehicle V. The camera transmits imaging information related to the outside situation of the host vehicle V to the ECU 10. The camera may be a monocular camera and may be a stereo camera. The stereo camera includes two imaging units disposed such that the binocular parallax is realized. Imaging information of the stereo camera includes depth direction information also.

The radar sensor is a detecting device that detects an obstacle in the vicinity of the host vehicle V by using a radio wave (for example, millimeter wave) or light. Examples of the radar sensor include a millimeter wave radar and a light detection and ranging (LIDAR). The radar sensor detects an obstacle by transmitting a radio wave or light to the vicinity of the host vehicle V and receiving the radio wave or light reflected by the obstacle. The radar sensor transmits information about the detected obstacle to the ECU 10. Examples of the obstacle include a moving obstacle such as a pedestrian and a vehicle in addition to a fixed obstacle such as a guardrail and a building.

The first speaker 2 and the second speaker 3 output a sound to the outside of the host vehicle. The first speaker 2 outputs a sound throughout an area around the host vehicle V. The second speaker 3 is higher than the first speaker 2 in directivity of an output sound. The second speaker 3 can output a sound in a predetermined direction from the host vehicle V. For example, the second speaker 3 may include a plurality of high-directivity speakers and the second speaker 3 may be configured to be able to output a sound in respective directions from the host vehicle V with the speakers. In addition, the second speaker 3 may be configured to be able to output a sound in respective directions from the host vehicle V by changing the orientation of a high-directivity speaker. The first speaker 2 and the second speaker 3 output a sound based on the control signal from the ECU 10.

The automatic driving ECU 4 executes automatic driving of the host vehicle V. The automatic driving ECU 4 is an electronic control unit including a CPU, a ROM, a RAM, a CAN communication circuit, and the like. The automatic driving ECU 4 is connected to a map data base storing map information, a position measuring unit that measures the position of the host vehicle V in a map with a global positioning system (GPS), various actuators for causing the host vehicle V to travel, and various sensors including the external sensor 1.

The automatic driving ECU 4 is connected to a network that performs communication by using, for example, the CAN communication circuit and is connected such that the automatic driving ECU 4 can communicate with each component of the host vehicle V. That is, the automatic driving ECU 4 can refer to the map information of the map data base, information about the position of the host vehicle V in the map that is measured by the position measuring unit, and the result of detection performed by the various sensors. The ECU 10 can output signals to the various actuators.

The automatic driving ECU 4 loads a program stored in the ROM into the RAM and executes the program loaded in the RAM with the CPU so as to realize functions of an automatic driving system installed in the host vehicle V. The automatic driving ECU 4 may include a plurality of ECUs.

The map information of the map data base includes, for example, position information of a road (position information for each lane), information about the shape of a road (for example, information about type of curve or straight portion, curvature of curve, or like), information about the width of a road (information about width of lane), information about the slope of a road, information about the cant angle of a road, information about the speed limit for a road, and information about a road marking such as a crosswalk provided on a road. The various actuators include a steering actuator that controls the steering angle of the host vehicle V, a brake actuator that controls a brake system of the host vehicle V, and an engine actuator that controls an engine of the host vehicle V (or motor of electric car).

The automatic driving ECU 4 searches for a target route from the current position of the host vehicle V to a destination based on the map information of the map data base, the information about the position of the host vehicle V in the map that is measured by the position measuring unit, and a destination set in advance. The automatic driving ECU 4 generates a traveling plan for causing the host vehicle V to travel along the target route. The traveling plan includes, for example, a moving route and a moving speed. The automatic driving ECU 4 generates the traveling plan of the host vehicle V by using a known method. The automatic driving ECU 4 executes automatic driving of the host vehicle V according to the traveling plan based on the information about the position of the host vehicle V in the map that is measured by the position measuring unit. In addition, the automatic driving ECU 4 transmits the generated traveling plan to the ECU 10. The automatic driving ECU 4 executes the automatic driving by controlling the host vehicle V by transmitting a control signal to the various actuators.

The ECU 10 includes a notification target person detecting unit 11, a traveling state detecting unit 12, and a notification control unit 13, functionally. Note that, a portion of the functions of the ECU 10 may be executed by a computer in a facility such as an information management center that can communicate with the host vehicle V and may be executed by a portable information terminal that can communicate with the host vehicle V.

The notification target person detecting unit 11 detects a notification target person in the vicinity of the host vehicle V based on the result of detection performed by the external sensor 1. The notification target person detecting unit 11 can detect the notification target person by using a known method based on the result of detection performed by the external sensor 1. In addition, the notification target person detecting unit 11 detects the position of the notification target person relative to the host vehicle V (direction from host vehicle V in which notification target person is present). Note that, the notification target person is a pedestrian in the vicinity of the host vehicle V, a person on a bicycle, or the like.

The traveling state detecting unit 12 detects the traveling state of the host vehicle V. In the present embodiment, the traveling state detecting unit 12 can detect the traveling state based on the traveling plan generated by the automatic driving ECU 4. The traveling state detecting unit 12 detects whether the host vehicle V is stopped or not, whether the host vehicle V is in a normal traveling state or not, whether the host vehicle V is in the middle of deceleration or not, whether the host vehicle V is in the middle of acceleration or not, or the like as the traveling state of the host vehicle V. Note that, the traveling state detecting unit 12 may detect the traveling state based on information other than the traveling plan by using the speed of the host vehicle V or the like.

The notification control unit 13 causes the first speaker 2 and the second speaker 3 to output a notification sound by outputting a control signal to the first speaker 2 and the second speaker 3 based on the traveling state. Note that, the notification control unit 13 causes the first speaker 2 and the second speaker 3 to output a notification sound when the traveling state of the host vehicle V satisfies a condition for outputting the notification sound from the first speaker 2 and the second speaker 3. Here, the condition for outputting the notification sound may be a condition that the vehicle speed of the host vehicle V is equal to or smaller than a predetermined vehicle speed (for example, speed equal to or smaller than 30 km/h), for example. In addition, the condition for outputting the notification sound may include a condition that a shift lever of the host vehicle V is not in a parking range (P range), in addition to the above-described condition related to the vehicle speed. As described above, the condition for outputting the notification sound may be appropriately set in advance. For example, the traveling state detecting unit 12 detects various kinds of traveling states of the host vehicle V corresponding to respective items of the condition for outputting the notification sound. In addition, the notification control unit 13 may determine whether the condition for outputting the notification sound is satisfied or not based on the various kinds of traveling states detected by the traveling state detecting unit 12.

When the condition for outputting the notification sound is satisfied, the notification control unit 13 causes the first speaker 2 to output a traveling notification sound indicating that the host vehicle V is traveling when the host vehicle V is traveling, based on the traveling state detected by the traveling state detecting unit 12. In addition, the notification control unit 13 causes the first speaker 2 to output a vehicle stoppage notification sound indicating that the host vehicle V is stopped when the host vehicle V is stopped.

Here, the traveling notification sound is a continuous sound continuously output from the first speaker 2. As the traveling notification sound, a sound that conjures up images of a rotating rotator or the like may be used. Note that, the notification control unit 13 may cause the first speaker 2 to output different kinds of continuous sounds as the traveling notification sound corresponding to whether the host vehicle V is in the middle of deceleration, the host vehicle V is in a normal traveling state, or the host vehicle V is in the middle of acceleration. In addition, unlike a repetitive sound of which the intensity is repeatedly changed, examples of the continuous sound include a sound of which the intensity is constant, a sound of which the intensity is gradually increased, and a sound of which the intensity is gradually decreased. That is, the continuous sound may be any sound as long as the intensity thereof is not repeatedly changed. In addition, the scale of the continuous sound may be changed while the continuous sound is being output. For example, the continuous sound may be a sound like "eee" which is generated when a rotator is rotated.

The vehicle stoppage notification sound is an intermittent sound intermittently output from the first speaker 2 or a repetitive sound of which the intensity is repeatedly changed. The vehicle stoppage notification sound may be a sound that conjures images of something resting or a sound that conjures images of something stopped due to a change from a traveling state to a vehicle stoppage state. The scales of the intermittent sound and the repetitive sound may be changed while the intermittent sound and the repetitive sound are being output. For example, the intermittent sound may be a sound like "pong-pong-pong" in which a predetermined sound is repeatedly output at a predetermined cycle. In addition, the repetitive sound may be a sound like "fang-fang-fang" in which the intensity of a predetermined sound is repeatedly changed.

In addition, when the notification target person is detected by the notification target person detecting unit 11, the notification control unit 13 causes the second speaker 3 to output a target person recognition sound indicating that the out-of-vehicle notification device 100 has recognized the notification target person to the notification target person. At this time, the notification control unit 13 causes the second speaker 3, which has a directivity, to output the target person recognition sound toward the notification target person detected by the notification target person detecting unit 11 (in direction toward notification target person).

Here, the target person recognition sound is a different kind of sound from the continuous sound (traveling notification sound). The target person recognition sound is a sound from the out-of-vehicle notification device 100 that can give some feedback to the notification target person and a sound that gives a feeling of safety may be used as the target person recognition sound. For example, the target person recognition sound may be an intermittent sound such as a sonar sound. If the vehicle stoppage notification sound and the target person recognition sound are intermittent sounds, the intermittent sounds may be different kinds of intermittent sounds from each other and may be different from each other in cycle of intermittence. In addition, the scale of the target person recognition sound may be changed while the target person recognition sound is being output.

Figure 2:
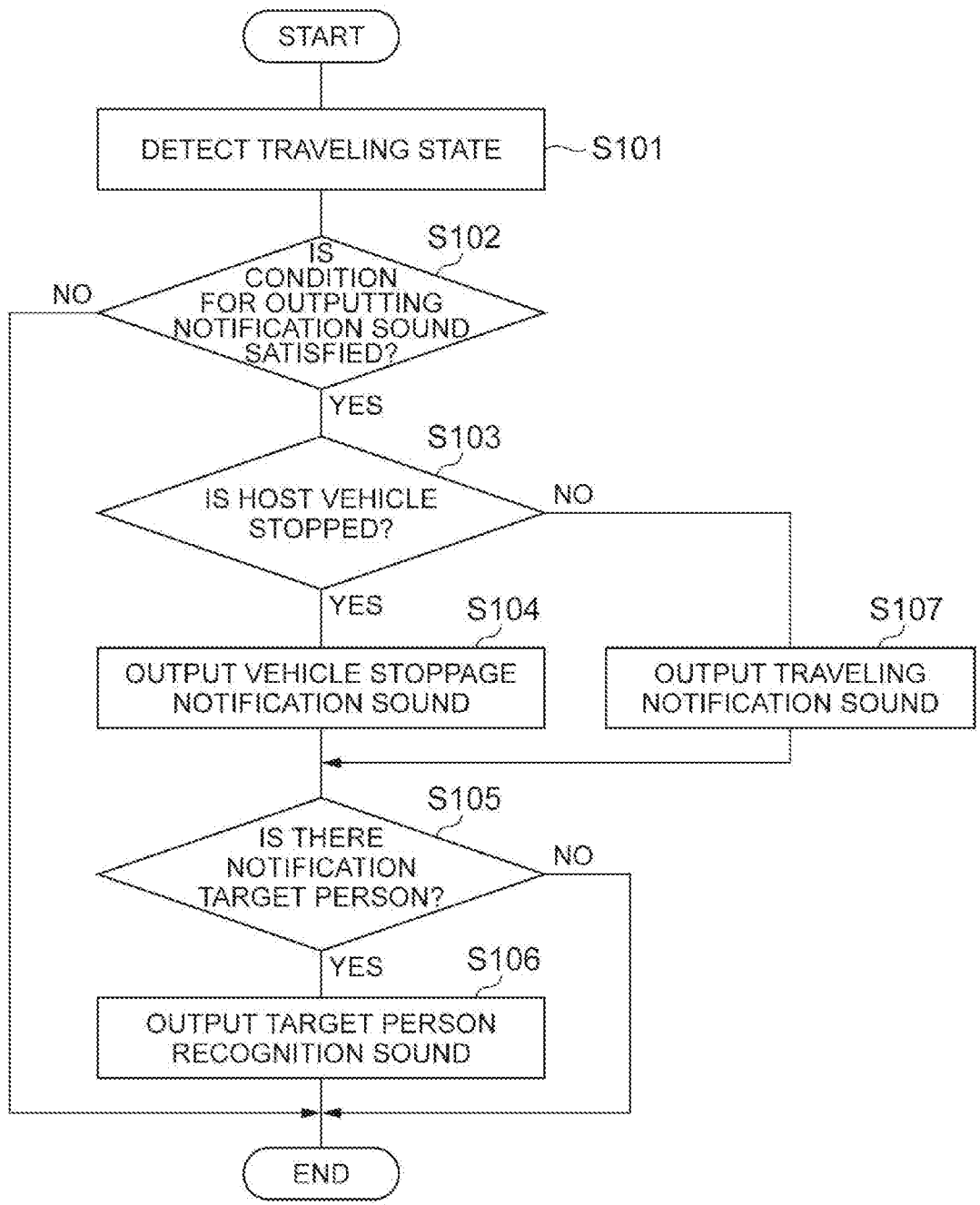
FIG. 2 is a flowchart illustrating the flow of a notification process performed by the out-of-vehicle notification device.

Next, the flow of a notification process performed by the out-of-vehicle notification device 100 will be described by using a flowchart in FIG. 2. Note that, the process shown in FIG. 2 is executed while the host vehicle V is being automatically driven. In addition, the process shown in FIG. 2 is restarted from the start when a predetermined time elapses after the process reaches the end.

As illustrated in FIG. 2, the traveling state detecting unit 12 detects the traveling state of the host vehicle V when the notification process is started (S101). The notification control unit 13 determines whether the traveling state of the host vehicle V satisfies the condition for outputting the notification sound or not (S102). When the condition for outputting the notification sound is not satisfied (S102: NO), the ECU 10 terminates the current process and restarts the process from the start after the predetermined time elapses.

When the condition for outputting the notification sound is satisfied (S102: YES), the notification control unit 13 determines whether the host vehicle V is stopped or not (S103). When the host vehicle V is stopped (S103: YES), the notification control unit 13 causes the first speaker 2 to output the vehicle stoppage notification sound. Meanwhile, when the host vehicle V is not stopped (S103: NO), that is, when the host vehicle V is traveling, the notification control unit 13 causes the first speaker 2 to output the traveling notification sound (S107). After the vehicle stoppage notification sound or the traveling notification sound is output, the notification target person detecting unit 11 detects whether there is a notification target person in the vicinity of the host vehicle V (S105).

When there is no notification target person (S105: NO), the ECU 10 the current process and restarts the process from the start after the predetermined time elapses. Meanwhile, when there is a notification target person (S105: YES), the notification control unit 13 causes the second speaker 3 to output the target person recognition sound toward the detected notification target person (S106). That is, the target person recognition sound is output from the second speaker 3 while being superimposed on the vehicle stoppage notification sound or the traveling notification sound output from the first speaker 2. After the target person recognition sound is output, the ECU 10 the current process and restarts the process from the start after the predetermined time elapses.

As described above, in the case of the out-of-vehicle notification device 100, a sound that is output when the host vehicle V is traveling and a sound that is output when the host vehicle V is stopped are different kinds of sounds from each other (traveling notification sound and vehicle stoppage notification sound).

Accordingly, the notification target person in the vicinity of the host vehicle V can easily distinguish between the traveling states of the host vehicle V with a difference between the kinds of sounds. In addition, since the vehicle stoppage notification sound is output when the host vehicle V is stopped, the notification target person in the vicinity of the host vehicle V can recognize that the host vehicle V is stopped. As described above, the out-of-vehicle notification device 100 can more appropriately notify the notification target person of the traveling state of the host vehicle V.

When the notification target person in the vicinity of the host vehicle V is detected, the out-of-vehicle notification device 100 can notify the notification target person that the notification target person has been recognized by outputting the target person recognition sound to the notification target person. Accordingly, the notification target person can recognize that the host vehicle V is aware of the presence of the notification target person and thus the notification target person can take an action with an easy mind.

The out-of-vehicle notification device 100 causes the second speaker 3, which is higher than the first speaker 2 in directivity with respect to the notification target person in the vicinity of the host vehicle V, to output the target person recognition sound toward the notification target person. In this case, the out-of-vehicle notification device 100 can more appropriately output the target person recognition sound to the notification target person.

The traveling state detecting unit 12 detects the traveling state based on the traveling plan generated by the automatic driving ECU 4. In this case, the out-of-vehicle notification device 100 can perform notification about the traveling state of the automatically driven host vehicle V by using a sound.

Hereinabove, the embodiment of the present disclosure has been described. However, the present disclosure is not limited to the above-described embodiment. For example, the host vehicle V may be an electric car which travels by being driven by a motor or a hybrid car which travels by being driven by at least any one of a motor or an engine. In this case, the out-of-vehicle notification device 100 can perform notification about the traveling state of the host vehicle V by outputting the vehicle stoppage notification sound even if no sound is being generated from the motor or the engine due to stoppage of the host vehicle V.

Note that, the host vehicle V is not limited to an automatically driven vehicle which automatically travels and may be a manually driven vehicle which travels by being manually operated by a driver. Even when the host vehicle V is a manually driven vehicle, the out-of-vehicle notification device 100 can perform notification about the traveling state of the host vehicle V.

Note that, the out-of-vehicle notification device 100 may not output the target person recognition sound by using the second speaker 3 which is higher than the first speaker 2 in directivity. In addition, the out-of-vehicle notification device 100 may be configured not to output the target person recognition sound.

What is claimed is:

1. A notification device which performs a notification to an outside of a host vehicle, comprising:
   a traveling state detection unit configured to detect a traveling state of the host vehicle;
   a first output unit configured to output a first sound to an outside of the host vehicle indicating that the host vehicle is in a stoppage mode when the host vehicle is in the stoppage mode based on the traveling state detected by the traveling state detection unit; and
   a second output unit configured to output a second sound to an outside of the host vehicle indicating that a target person in a vicinity of the host vehicle is recognized when the host vehicle is in the stoppage mode based on the traveling state detected by the traveling state detection unit,
   wherein the first sound is a first intermittent sound or a first repetitive sound of which an intensity is repeatedly increased and decreased.

2. The notification device according to claim 1, wherein the second sound is a second intermittent sound that is different from the first intermittent sound or a second repetitive sound that is different from the first repetitive sound.

3. The notification device according to claim 2, wherein a first intermittent cycle of the first sound is different from a second intermittent cycle of the second sound.

4. The notification device according to claim 1, wherein a scale of the second sound is changed while the second sound is being output.

5. The notification device according to claim 1, wherein the second sound is output after the first sound is output.

6. A method of performing a notification to an outside of a host vehicle, the method comprising:
   detecting a traveling state of the host vehicle by a traveling state detection unit;
   outputting a first sound to an outside of the host vehicle indicating that the host vehicle is in a stoppage mode when the host vehicle is in the stoppage mode based on the traveling state detected by the traveling state detection unit; and outputting a second sound to an outside of the host vehicle indicating that a target person in a vicinity of the host vehicle is recognized when the host vehicle is in the stoppage mode based on the traveling state detected by the traveling state detection unit, wherein the first sound is a first intermittent sound or a first repetitive sound of which an intensity is repeatedly increased and decreased.

7. The method according to claim 6, wherein the second sound is a second intermittent sound that is different from the first intermittent sound or a second repetitive sound that is different from the first repetitive sound.

8. The method according to claim 7, further comprising:

outputting the first sound at a first intermittent cycle, and outputting the second sound at a second intermittent cycle that is different from the first intermittent cycle.

9. The method according to claim 6, further comprising changing a scale of the second sound while outputting the second sound.

10. The method according to claim 6, further comprising outputting the second sound after outputting the first sound.

* * * * *